Oct. 12, 1954

G. S. JONES ET AL 2,691,321

TRANSPARENT DOCUMENT APERTURE GUIDEWAY
FOR COPYING CAMERAS AND PROJECTORS

Filed Dec. 22, 1951

GEORGE S. JONES
THADDEUS SWANKE
INVENTORS

BY Daniel I. Mayne

Lloyd F. Seebach
ATT'Y.- AG'T.

Oct. 12, 1954
G. S. JONES ET AL
2,691,321
TRANSPARENT DOCUMENT APERTURE GUIDEWAY
FOR COPYING CAMERAS AND PROJECTORS
Filed Dec. 22, 1951
2 Sheets-Sheet 2
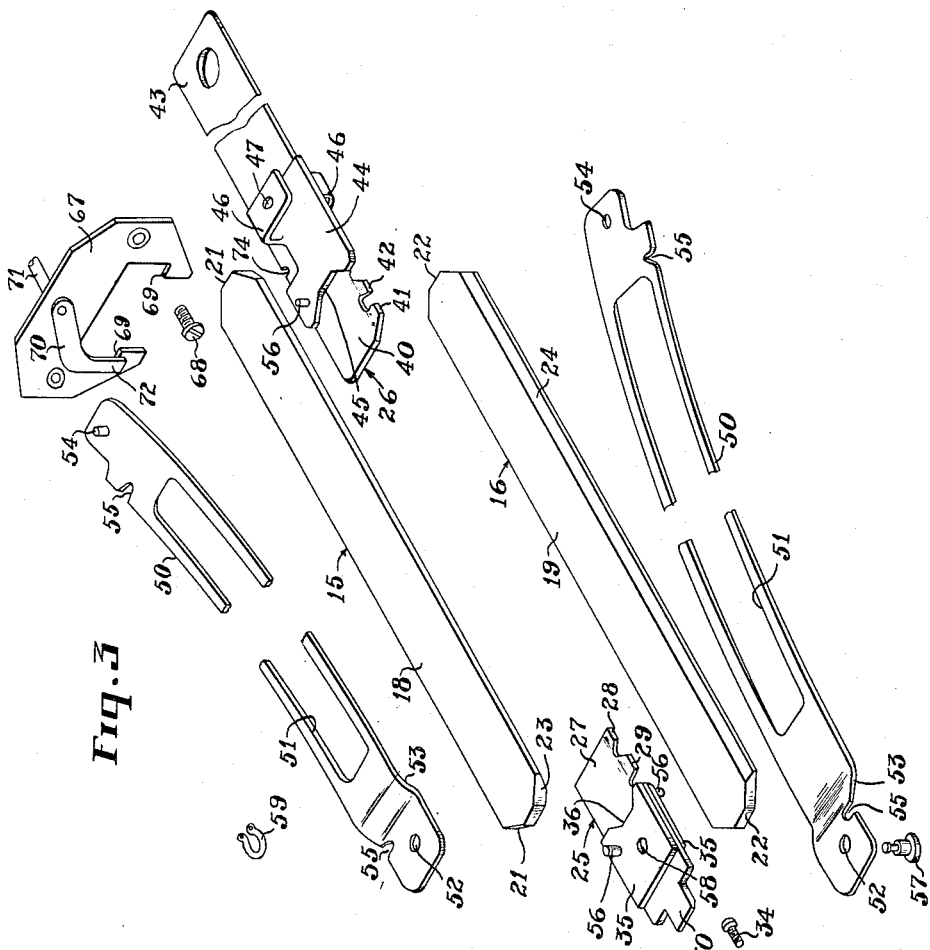
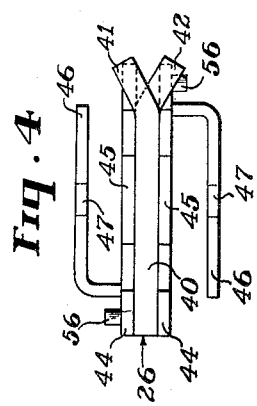
GEORGE S. JONES
THADDEUS SWANKE
INVENTORS
BY Daniel I. Mayne
Lloyd F. Seebach
ATT'Y.-AG'T.

Patented Oct. 12, 1954

2,691,321

UNITED STATES PATENT OFFICE 2,691,321

TRANSPARENT DOCUMENT APERTURE GUIDEWAY FOR COPYING CAMERAS AND PROJECTORS

George S. Jones and Thaddeus Swanke, Rochester, N. Y., assignors to Eastman Kodak Company, Rochester, N. Y., a corporation of New Jersey Application December 22, 1951, Serial No. 262,956

8 Claims. (Cl. 88—24)

This invention relates to photographic copying apparatus and, more particularly, to an arrangement whereby the separated glass guides in the photographic field are assembled as a unit to form an accurate guideway for the document.

In photographic copying apparatus of the type in which both sides of a document are photographed simultaneously as it is moved past apertures defining the photographic field, it is customary to move the document between glass plates arranged in the photographic field. Heretofore, the glass plates were usually mounted separately in slideways and, by virtue of being so mounted, were subjected to chipping, finger prints and breakage. It was also found that, when the glass plates were removed for cleaning, the operator often forgot to replace both plates. The present invention overcomes these disadvantages in that by assembling the glass-guides as a unit for insertion into or removal from the machine, there is less chance of breakage, the glass guides are protected against finger prints and the assembled unit is easily disassembled to clean the glass plates. Also, the glass plates are separated by the required distance when assembled so that an accurate guideway is formed through which the documents can pass unhindered while being photographed.

The primary object of the invention, therefore, is to assemble a pair of glass plates in spaced parallel relation to form an accurate guideway which is movable as a rigid unit.

Another object of the invention is to provide in a photographic copying apparatus a pair of glass plates arranged in spaced parallel relation as a unit to form an accurate guideway through which documents can be moved.

And still another object of the invention is to provide in a photographic copying apparatus a pair of spaced glass plates which have spacing members therebetween, the plates and members being retained in an assembled relation by flexible members detachably secured to the spacing members and engaging said plates to maintain the plates and spacing members in an assembled relation.

These and other objects and advantages will be apparent to those skilled in the art by the description which follows.

The objects of the invention are embodied in an assembly into a single unit of two elongated glass plates having parallel surfaces and adapted to be arranged in spaced parallel relation to provide a guideway for a document to be moved therebetween, said plates having the facing surfaces at the ends thereof engaged by spacing members which are provided with open end recesses to receive the ends of said plates. Flexible retaining members are pivotally mounted at one end thereof on one of the spacing members and are detachable secured at the other ends to the other spacing member, the flexible members holding the spacing members against the ends of the plates and engaging the outer surface of said plates to hold said plates against said spacing members so that the plates and spacing members are held in an assembled relation as a unit.

Reference is now made to the accompanying drawings wherein like reference numerals designate like parts and wherein:

Fig. 3 is an exploded perspective view of the guide plate assembly and the supporting and positioning members; and Fig. 4 is an enlarged end elevation of the spacing member and locating member used at one end of the assembled unit and showing said members in their assembled relation.

Figure 1:
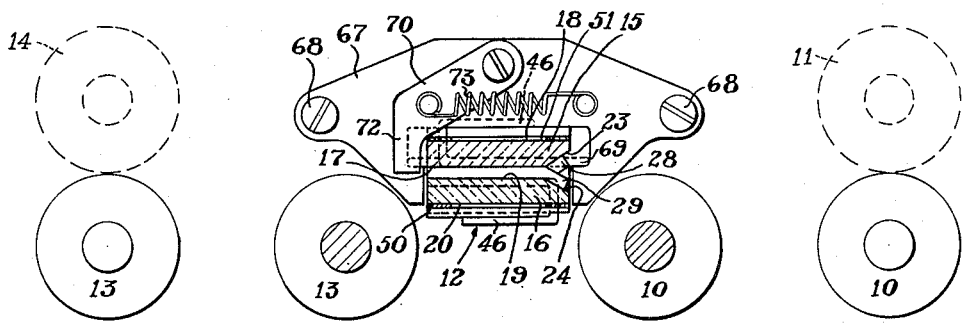
Fig. 1 is a vertical section through the assembled unit and showing it arranged in position in a photographic copying apparatus and between the feed rolls thereof.

With reference to Fig. 1, a document is moved by driven rolls 10 and idler rolls 11 through the photographic field 12 of a photographic copying apparatus and is then picked up by feed rolls 13 and idler rolls 14 to be moved out of the photographic field and into a suitable receptacle. As the document is moved through said field, it passes between plates 15 and 16 having parallel surfaces 17, 18 and 19, 20, respectively. It is well known that mirrors which are angularly disposed with respect to plates 15 and 16 will direct the reflected images of the obverse and reverse sides of the document to the camera. Since such systems are well known in the art, the complete system and camera have not been shown.

Plates 15 and 16 are elongated and have formed ends 21 and 22, respectively, the plates being made preferably of glass, although other materials, such as an optically transparent plastic material, may be used. Facing surfaces 17 and 19 are beveled, as shown at 23 and 24 to provide a throat for the document being moved between said plates and to provide a means whereby the plates can be assembled in only one way as described hereinafter, see Fig. 1.

The spacing members for maintaining plates 15 and 16 in a spaced parallel relation are broadly designated by the numerals 25 and 26, see Fig. 3. The left-hand spacing member 25 is a flat plate having a portion 27 which engages the surfaces 17 and 19 and has a pair of ears 28 and 29 which are formed in opposite directions to engage beveled surfaces 23 and 24, respectively. The end opposite portion 27 is provided with a tongue 30 for engaging the aperture 31 in plate 32 which is secured to wall 33 by screws 34. Locating members 35 are secured to opposite sides of spacing plate 25, each locating member having an end 36 which is formed in accordance with ends 21 and 22 of plates 15 and 16. As shown in Fig. 3, when these members 25 and 35 are secured together, end 36 and portion 27 combine to form an open-ended recess for receiving ends 21 and 22 of plates 15 and 16, members 35 being thinner than said plates. Right hand spacing member 26 is also a flat plate having a portion 40 which engages surfaces 17 and 19 and has a pair of ears 41 and 42 which are formed in opposite directions to engage beveled surfaces 23 and 24, respectively. The end opposite portion 40 comprises a handle 43 for inserting the assembled unit in position in the photographic field. Locating members 44 are secured to opposite sides of member 26, each locating member having an end 45 which is formed to correspond to ends 21 and 22 of plates 15 and 16 and form with portion 40 an open-end recess for the ends of said plates. Opposite end 45 an extension 46 is formed from each locating member, said extension being spaced therefrom, as shown in Fig. 3, and provided with an aperture 47.

Figure 2:
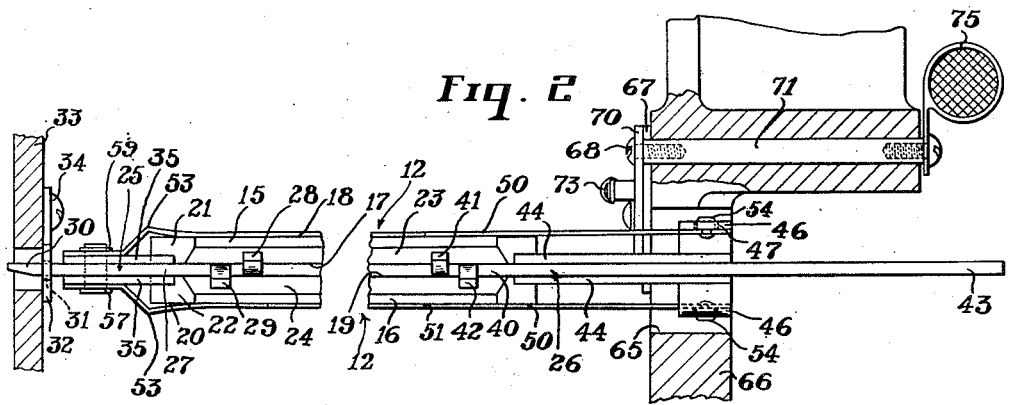
Fig. 2 is a front elevation of the guide plate assembly and showing the manner in which said assembly is supported and positioned in the photographic field.

The retaining members 50 are preferably thin resilient metal strips which are normally bowed, as shown in Fig. 3, and which are provided with an aperture 51 for determining the photographic field or aperture with respect to the document. The strips 50 are provided with apertures 52 at one end thereof and are formed at 53 adjacent said apertures as shown in Fig. 2. Pins 54 are secured to the opposite ends of said strips and each end is provided with notches 55 for engaging pins 56 on locating members 35 and 44. Strips 50 are pivotally secured to locating members 35 and spacing member 25 by stud 57 which is inserted through aperture 52 in lower strip 50, aperture 58 in locating members 35 and spacing member 25 and through aperture 52 in upper strip 50 and which is secured in position by the resilient arcuate washer 59.

To assemble plates 15 and 16 as a unit, strips 50 are rotated in opposite directions so that notches 55 are disengaged from pins 56. Plate 15 is then positioned on engaging portion 27 with end 21 in engagement with end 36 of locating member 35. Engaging portion 40 is then positioned under plate 15 at the other end so that end 21 engages end 45 of locating member 44. Ears 28 and 41 will then engage beveled surface 23 to properly position plate 15 and prevent plate 15 from being assembled incorrectly or interchanged with plate 16. The upper resilient strip 50 is then moved in a counter-clockwise direction and, at the same time, urged toward plate 15, the free end being moved under extension 46 so that pin 54 enters aperture 47, and at which time notches 55 will be in engagement with pins 56 to prevent further movement of strip 50. The assembled parts are then turned once and plate 16 is placed on portions 27 and 40 with the ends 22 engaging ends 36 and 45 of locating members 35 and 44, respectively and with ears 29 and 42 engaging bevel 24. The other strip 50 is then urged toward plate 16 and moved under extension 46 as just described so that pin 54 engages aperture 47. The resilient members 50 then hold the spacing members 25 and 40 against any endwise motion with respect to plates 15 and 16 and also urge said plates against said members to provide a rigid and compactly assembled unit with plates 15 and 16 maintained in spaced parallel relation, the spacing between said plates being determined by the thickness of members 25 and 40 and the photographic field being determined by apertures 51.

The assembled unit is positioned in the photographic field by grasping handle portion 43 and inserting the unit in aperture 65 in wall 66 until tongue 30 engages aperture 31 in plate 32 on the opposite wall 33. Plate 67 is secured to the inner surface of wall 66 by screws 68 and has supporting lips 69 which engage the edges and underside of member 26 to support the unit at its other end. To properly locate and lock the unit against lateral movement, an arm 70 is secured to the inner end of a rotatable shaft 71 and has a tail 72 which is biased by spring 73 into a locating notch 74 in member 40. Finger piece 75 is secured to the outer end of shaft 71 to release tail 72 from notch 74 for removing the assembled unit for cleaning or replacement. It is readily apparent that such a unit can be easily disassembled and assembled and may be handled without smudging the glass surfaces, since it is not necessary to handle the glass plates at any time except during replacement.

Since many other modifications of the invention will be suggested to those skilled in the art, the scope of the invention is not to be limited in any respect by the present disclosure but is defined in the appended claims.

Having now particularly described our invention, what we desire to secure by Letters Patent of the United States and what we claim is:

1. In a device of the character described, the combination comprising a pair of elongated transparent plates having parallel surfaces and arranged in spaced parallel relation to provide a guideway for a document to be moved therebetween, spacing means arranged at opposite ends of and between said plates and having open-end recesses corresponding to the ends of said plates for receiving the ends thereof and for engaging a portion of the facing surfaces of said plates to maintain said plates in said spaced parallel relation, and retaining means detachably arranged on said spacing means for holding said plates and spacing means in assembled relation.

2. In a device of the character described, the combination comprising a pair of elongated transparent plates having parallel surfaces and arranged in spaced parallel relation to provide a guideway for a document to be moved therebetween, spacing means arranged at opposite ends of and between said plates and having open-end recesses corresponding to the ends of said plates for receiving the ends thereof and for engaging a portion of the facing surfaces of said plates to maintain said plates in said spaced parallel relation, and resilient retaining means provided with an aperture for determining a photographic field and detachably arranged on said spacing means and engaging said plates for holding said plates and spacing means in assembled relation.

3. In a device of the character described, the combination comprising a pair of elongated transparent plates having parallel surfaces and arranged in spaced parallel relation to provide a guideway for a document to be moved therebetween, the facing surfaces of each plate being beveled to form a throat for the entry of said document, spacing members arranged at each end of and between said plates for engaging a portion of said facing surfaces to maintain said plates in spaced parallel relation, positioning members arranged on said spacing members for engaging the bevels on said plates, locating members secured to opposite sides of said spacing members and having ends thereof formed in accordance with the ends of said plates to form recesses with said spacing members for receiving the ends of said transparent plates, and retaining members detachably arranged on said locating members for engaging the outer surfaces of said plates and for holding said plates and spacing members in an assembled relation.

4. In a device of the character described, the combination comprising a pair of elongated transparent plates having parallel surfaces and arranged in spaced parallel relation to provide a guideway for a document to be moved therebetween, the facing surfaces of each plate being beveled to form a throat for the entry of said document, spacing members arranged at each end of and between said plates for engaging a portion of said facing surfaces to maintain said plates in spaced parallel relation, positioning members arranged on said spacing members for engaging the bevels on said plates, locating members secured to opposite sides of said spacing members and having ends thereof formed in accordance with the ends of said plates to form recesses with said spacing members for receiving the ends of said transparent plates, and resilient retaining members provided with apertures for determining a photographic field and detachably secured to said locating members for holding said plates and spacing members in an assembled relation.

5. In a device of the character described, the combination comprising a pair of elongated transparent plates having parallel surfaces and arranged in spaced parallel relation to provide a guideway for a document to be moved therebetween, spacing members between said plates at the ends thereof for engaging and separating the facing surfaces of said plates, locating members secured to opposite sides of said spacing members and having ends corresponding to the ends of said plates and forming with said spacing members open-end recesses for receiving the ends of said plates, and bowed resilient members provided with apertures for determining the photographic field and pivotally mounted on opposite sides of one of said spacing members, said resilient members being biased against the outer faces of said plates and detachably secured to said other spacing member for holding said plates and spacing members in assembled relation.

6. In photographic copying apparatus having a photographic field and means for moving a document through said field, the combination comprising a pair of elongated transparent plates having parallel surfaces and arranged in said photographic field in spaced parallel relation to provide a guideway for a document moved therebetween, spacing members between said plates at the ends thereof for engaging and separating the facing surfaces of said plates and including locating recesses corresponding to the ends of said plates and for receiving the ends thereof, flexible elongated members having ends pivotally secured to opposite sides of one of said spacing members and provided with an elongated aperture for determining the photographic field with respect to said document, said flexible members being movable in opposite directions over said plates to a position for detachably securing the other ends to opposite sides of said other spacing member whereby said flexible members are urged into engagement with the outer surfaces of said plates to maintain said plates and spacing members in assembled relation as a unit, means for engaging said spacing members to support and position said unit in said photographic field, and means for engaging one of said spacing members to prevent lateral movement of said unit in said photographic field.

7. In photographic copying apparatus having a photographic field and means for moving a document through said field, the combination comprising a pair of elongated transparent plates having parallel inner and outer faces and arranged in said photographic field in spaced parallel relation to provide a guideway for a document moved therebetween, the inner faces of said plates being beveled along an edge thereof to form a throat for the entry of said document, spacing members between said plates at the ends thereof for engaging said inner surfaces to maintain said plates in spaced parallel relation and including a pair of ears formed to engage said bevels on the plates and locating recesses corresponding to the ends of said plates and for receiving the ends thereof, said ears and recesses locating said plates relative to said spacing members and forming said throat, flexible elongated members for masking said plates and provided with elongated apertures for determining the photographic field with respect to the document, said flexible members having ends pivotally secured to opposite sides of one of said spacing members and movable in opposite directions over said plates to a position for detachably securing the other ends to opposite sides of said other spacing member whereby said flexible members are urged into engagement with the outer surfaces of said plate to maintain said plates and spacing members in assembled relation as a unit, means for engaging said spacing members to support and position said unit in said photographic field, and means for engaging one of said spacing members to prevent movement of said unit in said photographic field.

8. In photographic copying apparatus having a photographic field and means for moving a document through said field, the combination comprising a pair of elongated transparent plates having parallel inner and outer faces and arranged in said photogrphic field in spaced parallel relation to provide a guideway for a document moved therebetween, the inner faces of said plates being beveled along an edge thereof to form a throat for the entry of said document, spacing members arranged at each end of and between said plates for engaging a portion of said inner faces to maintain said plates in spaced parallel relation, positioning members formed on said spacing members for engaging the bevels on said plates, locating members secured to opposite sides of said spacing members and having ends thereof corresponding to the end of said plates to form recesses with said spacing members for receiving the ends of said plates, flexible elongated members for masking said plates and provided with elongated apertures for determining the photographic field with respect to the document, said flexible members having ends pivotally secured to said locating members at one end of said plates and movable in opposite directions over said plates to a position for detachably securing the other ends to said locating members at the other ends of said plates whereby said flexible members are biased into engagement with said outer faces to maintain said plates and spacing members in assembled relation as a unit, means for engaging said spacing members to support and position said unit in said photographic field, and means for engaging one of said spacing members to prevent lateral movement of said unit in said photographic field.

References Cited in the file of this patent

UNITED STATES PATENTS

| Number | Name | Date |
|---|---|---|
| 1,434,219 | Mengel | Oct. 31, 1922 |
| 1,939,561 | Martin | Dec. 12, 1933 |

FOREIGN PATENTS

| Number | Country | Date |
|---|---|---|
| 227,604 | Switzerland | June 30, 1943 |